United States Patent [19]

Takekado

[11] Patent Number: 5,202,804
[45] Date of Patent: Apr. 13, 1993

[54] MAGNETIC DISK DRIVE WITH A MAGNETIC HEAD ROTATIONALLY ACTUATED

[75] Inventor: Shigeru Takekado, Tokyo, Japan
[73] Assignee: Kabushiki Kaisha Toshiba, Kawasaki, Japan
[21] Appl. No.: 700,863
[22] Filed: May 16, 1991
[30] Foreign Application Priority Data
  May 18, 1990 [JP] Japan .................. 2-128710
[51] Int. Cl.⁵ .............................................. G11B 5/55
[52] U.S. Cl. ..................................... 360/106; 360/104
[58] Field of Search ................. 360/106, 104, 105, 109
[56] References Cited
  U.S. PATENT DOCUMENTS
  4,300,176 11/1981 Gilovich et al. ............... 360/105
  4,556,924 12/1985 Quist, Jr. et al. .............. 360/106
  4,745,504  5/1988 Foote ............................. 360/106
  4,751,597  6/1988 Anderson ...................... 360/106
  4,796,131  1/1989 Chang ........................... 360/106
  4,947,275  8/1990 Hinlein ......................... 360/106

FOREIGN PATENT DOCUMENTS
  294078 4/1990 Japan.

Primary Examiner—John H. Wolff
Attorney, Agent, or Firm—Oblon, Spivak, McClelland, Maier & Neustadt

[57] ABSTRACT

A magnetic disk drive for reading information stored in a recording disk and/or writing information to the recording disk comprises a magnetic head for reading and/or writing information to the recording disk, an arm portion for carrying the magnetic head on one end thereof, an elastic portion for elastically supporting another end of the arm portion, the arm portion being rotatably supported, a fixed portion for holding the arm through the elastic portion, and a driver for rotating the arm portion by a driving force, the magnetic head carried on the arm portion being moved in the radial direction of the recording disk.

10 Claims, 5 Drawing Sheets

MAGNETIC DISK DRIVE WITH A MAGNETIC HEAD ROTATIONALLY ACTUATED

BACKGROUND OF THE INVENTION

1. Field of the Invention

The present invention relates to a magnetic disk drive for reading information stored in a recording disk and/or writing information to the recording disk, and in particular to a magnetic disk drive suitable for high density recording.

2. Description of Background Art

Recently, the use of small-sized portable Winchester magnetic disk drives has been rapidly developing.

Therefore, as a result of these recent developments, the track density of the magnetic disk has been improved. Also, the use of small-sized portable actuators has been rapidly developing. The actuator is capable of high speed access.

The above magnetic disk drive is explained with reference to FIG. 1 and FIG. 2.

Figure 1:
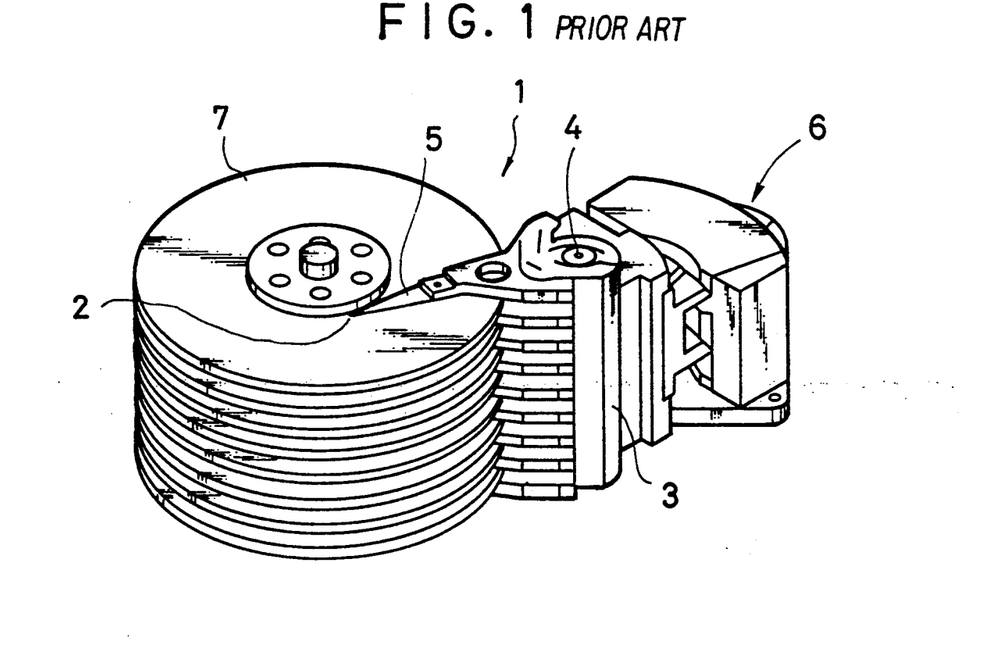
FIG. 1 is a diagonal view of a conventional magnetic disk drive.
Figure 2:
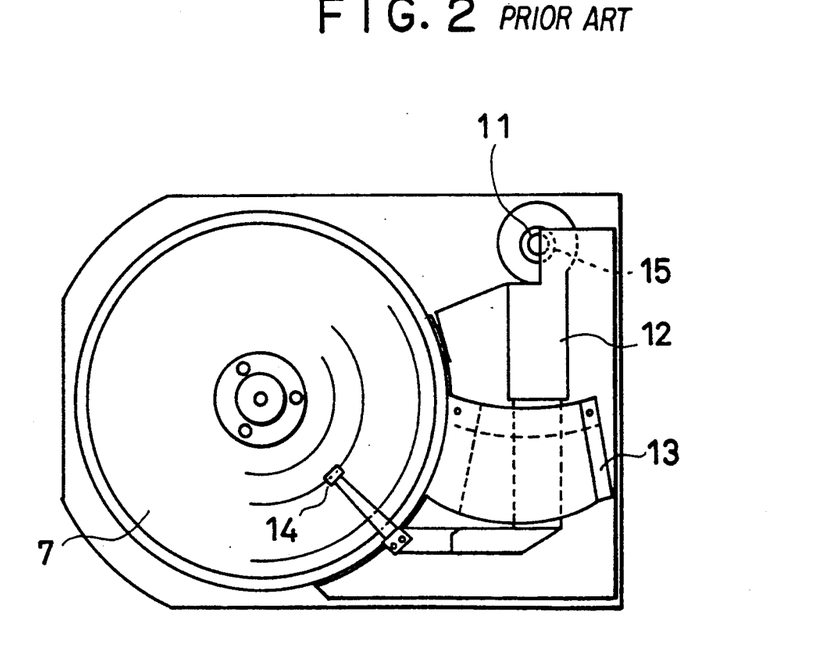
FIG. 2 is a plan view of another conventional magnetic disk drive.

As shown in FIG. 1, in the technology disclosed in Japanese Patent Publication No. 1-294278, a magnetic disk drive 1 comprises a head slider 2 to which a transducer of a magnetic head is attached, an arm assembly 3 for moving the head slider 2 rotatably, a pivot 4 which is positioned at the rotation center of the arm assembly 3, a suspension 5 which carries the magnetic head and connects the head slider 2 to the arm assembly 3, and a drive motor 6 for driving the arm assembly 3. Also, the pivot 4 comprises a pair of miniature ball bearings, and a shaft which is supported in a freely rotatable manner by the miniature ball bearings.

The head slider 2 is attached to the transducer for reading or writing information stored in a recording disk 7.

In the above structure, position information stored in the recording disk 7 is read by the transducer and fed back to the drive motor 6. In this operation, a positioning servo system is formed in the magnetic disk drive for positioning the actuator. Therefore, the information can be stored in the recording disk at high density and accessed by the head slider 2 at high speed.

However, in the above structure, the pivot 4 is included in the servo system so that the servo system is inclined to be unstable as the rigidity of the pivot 4 is reduced. Therefore, ball bearings having a superior rigidity are utilized in the pivot 4 and the bearings must be made with high accuracy. As a result, a large number of parts is required in the actuator even if the magnetic disk drive becomes small. Also, many processes are required for making the actuator so that the assembly accuracy of the actuator tends to be lowered.

Also, the actuator must be made of aluminum alloys or magnesium alloys. Therefore, the actuator is heavy so that the drive current for driving the actuator becomes large and a servo band tends to be narrowed. Also, the head slider 4 is easily caused to deviate by external shock. Moreover, two pairs of ball bearings are needed to drive the pivot 4 so that the production of the thin magnetic disk drive is difficult.

To solve the above drawbacks, a small-sized magnetic disk drive is proposed in U.S. Pat. No. 4,300,176. Also, the U.S. Pat. No. 4,751,597 is proposed as shown in FIG. 2. In the proposed magnetic disk drive shown in FIG. 2, a pivot 11 is arranged at one end of an arm assembly 12 and a drive motor 13 is arranged at another end of the arm assembly 12, that is near to a head slider 14. As compared with the magnetic head shown in FIG. 1, the arm assembly 12 is curved by 90 degrees. Therefore, the arm assembly 12 is elongated and weighted so that the magnetic head shown in FIG. 2 requires the use of relatively large bearings 15 in the pivot 11. In other words, the pivot 13 is as large as the pivot 5. This means that the magnetic head shown in FIG. 2 still has many parts and the assembly accuracy of the actuator still tends to be lowered.

Also, coils in the drive motor 13 for driving the head slider 14 are positioned near to the head slider 14, and the magnetic flux generated by the coils is directed to the head slider 14. Therefore, noises caused by the magnetic flux is apt to occur. This means that the magnetic disk drive shown in FIG. 2 is not suitable for high density recording.

Moreover, two pairs of ball bearings are required for operating the magnetic disk drive so that the production of a thin and small magnetic disk drive is difficult.

SUMMARY OF THE INVENTION

It is an object of the present invention to provide a magnetic disk drive suitable for the high density recording of information. By achieving the object, the magnetic disk drive has many merits. A first merit is that the disk drive has a simple, thin, and light structure. A second merit is that the disk drive requires relatively few parts and is produced with superior assembly accuracy. A third merit is that the cost of the production is lowered. A fourth merit is that any external shock does not exert an influence on the disk drive. A fifth merit is that little noise from the magnetic flux occurs and high density recording is possible.

These merits are achieved in the first modification of the present invention by the provision of a magnetic disk drive for reading information stored in a recording disk and/or writing information to the recording disk, comprising:

a magnetic head for reading and/or writing information to the recording disk;

an arm portion for carrying the magnetic head on one end thereof;

an elastic portion for elastically supporting another end of the arm portion, the arm portion being rotatably supported;

a fixed portion for holding the arm portion through the elastic portion; and a driver for rotating the arm portion by a driving force, the magnetic head carried on the arm portion being moved in the radial direction of the recording disk.

In the above structure, when the driving force is generated by the driver, the arm portion is moved so that the magnetic head carried on the arm portion is positioned at a prescribed position. When the arm portion is positioned, positioning information is read from the recording disk through the magnetic head in the magnetic disk drive.

The magnetic disk drive has a servo system for positioning the arm portion under the control of the positioning information read from the recording disk and feeding back the positioning information to the driver. Therefore, the positioning control becomes unstable when a resonant frequency of an actuator carrying the magnetic head is close to the gain-cross point of the servo system. In the present invention, the rigidity of the elastic portion is quite low compared with a bearing so that the frequency is lowered. This means that the disk drive according to the present invention has the possibility of lack of stability. However, by shortening the arm portion, the rigidity of the elastic portion in the present invention becomes suitable when the arm portion is improved. That is, a primary resonant frequency in a rotation mode is several Hertz (Hz) so that this value is low and can be ignored for the positioning servo system. A secondary resonant frequency is set to a value over a servo band so that a stable positioning servo system is provided.

It is preferable that the elastic portion be pliably bent while the arm portion is rotated and the elastic portion be stiff while the arm portion is moved in a straight line.

Also, it is preferable that the elastic portion include a first elastic element for connecting the fixed portion to the arm portion in the longitudinal direction of the arm portion, and a second elastic element for connecting the fixed portion to the arm portion in the lateral direction of the arm portion.

In the above structure, when the driving force is generated by the driver, the arm portion is rotated because a rotation moment is generated in the arm portion. Therefore, the first and second elastic elements are bent.

At this time, a straight force is also generated with the rotation moment in the arm portion. The rotation moment is useful for the movement of the magnetic head so that the elastic portion must be pliably bent when the arm portion is rotated. On the other hand, the straight force is not useful for the movement of the magnetic head so that the elastic portion must be stiff when the arm portion is moved straight.

In the present invention, because the elastic portion includes the first elastic element and the second elastic element, both elements receive the bending force while the arm portion is rotated. That is, the elastic portion is pliable.

However, the straight force of the arm portion give the compressive stress or the tensile stress to the second elastic element. That is, the elastic portion is stiff.

As a result, the secondary resonant frequency becomes high enough to provide a stable servo system.

Also, it is preferable that a part of the elastic portion be integrally molded with the arm portion.

In the above structure, the magnetic disk drive becomes light and the number of parts becomes small.

Also, it is preferable that the elastic portion include a viscoelastic portion for adding a viscoelastic characteristic to the elastic portion.

In the above structure, the viscoelastic portion imparts a damping effect to the elastic portion. The viscoelastic portion is, for example, made of silicone rubber. Also, it is possible for damping tapes to be applied to the surfaces of the elastic elements. The damping tapes are applied by a viscoelastic material.

The above object is also achieved in the second modification of the present invention by the provision of a magnetic disk drive for reading information stored in a recording disk and/or writing information to the recording disk, comprising:

a magnetic head for reading and/or writing information to the recording disk;

an arm portion for carrying the magnetic head on one end thereof;

a slide bearing portion for supporting the other end of the arm portion rotatably, the slide bearing portion comprising a pin and a hole for receiving the pin; and a driver for rotating the arm portion by a driving force, the magnetic head carried on the arm portion being moved in the radial direction of the recording disk.

In the above structure, the arm portion is rotatably supported by the slide bearing portion which is for example formed by a resin or oilless bearing. Therefore, when the driving force is generated by the driver, the arm portion is rotated before the magnetic head carried on the arm portion is positioned at a prescribed position. When the arm portion is positioned, the magnetic disk drive is given positioning information from the recording disk through the magnetic head.

The magnetic disk drive has a servo system for positioning the arm portion under the control of the positioning information from the recording disk. Therefore, the positioning control becomes unstable when a resonant frequency of an actuator carrying the magnetic head is close to the gain-cross point of the servo system. However, the slide bearing has no rigidity while ball bearings have high rigidity. Therefore, the primary resonant frequency in a rotation mode is almost zero so that the positioning servo system is always stable.

Also, it is preferable that the driver include a drive coil coiled parallel to a plane on which the arm portion is moved.

In the above structure, the magnetic flux generated by the driving current of the drive coil is directed at right-angles to the plane on which the arm portion is moved. As a result, the magnetic head is perfectly isolated from the dense magnetic flux. Therefore, the magnetic head is not influenced by the magnetic flux.

As a result, the magnetic noise generated by the driving current can be lowered. Also, the thickness of the magnetic disk drive can be small in the above structure of the drive coil. Moreover, the driving coil can be easily integrally molded with the arm portion. Therefore, the magnetic disk drive is light and the number of parts is small. This means that the structure of the magnetic disk drive provides high reliability.

Also, it is preferable that the arm portion be made of resin in the first and second modifications.

In the conventional magnetic disk drive, an arm portion is made of aluminum alloys or magnesium alloys. One reason is because a very high accuracy is required for producing the disk drive. A second reason is to provide a the high primary resonant frequency.

In the above structure of the present invention, the arm portion can be easily integrally molded with the elastic portion. Also, the magnetic disk drive becomes light and the number of parts becomes small. Moreover, no ball bearing is used so that high accuracy is not required for producing the magnetic disk drive. That is, the arm portion can be made of resin.

Also, it is preferable that a part of the drive coil be integrally molded with the arm portion in the first and second modifications.

In the above structure, the magnetic disk drive is light and the number of parts is small.

Also, it is preferable that the driving force generated by the driver is given between the one end and the other end of the arm portion in the first and second modifications.

In the above structure, because the structure is not influenced by the magnetic flux, the driver can be positioned close to the magnetic head so that the transmission distance of the driving force can be shorten. Therefore, the rigidity of the resin arm portion is enough for operation.

DESCRIPTION OF THE SPECIFIC EMBODIMENT

Preferred embodiments are described with reference to FIG. 3 to FIG. 6.

Figure 3:
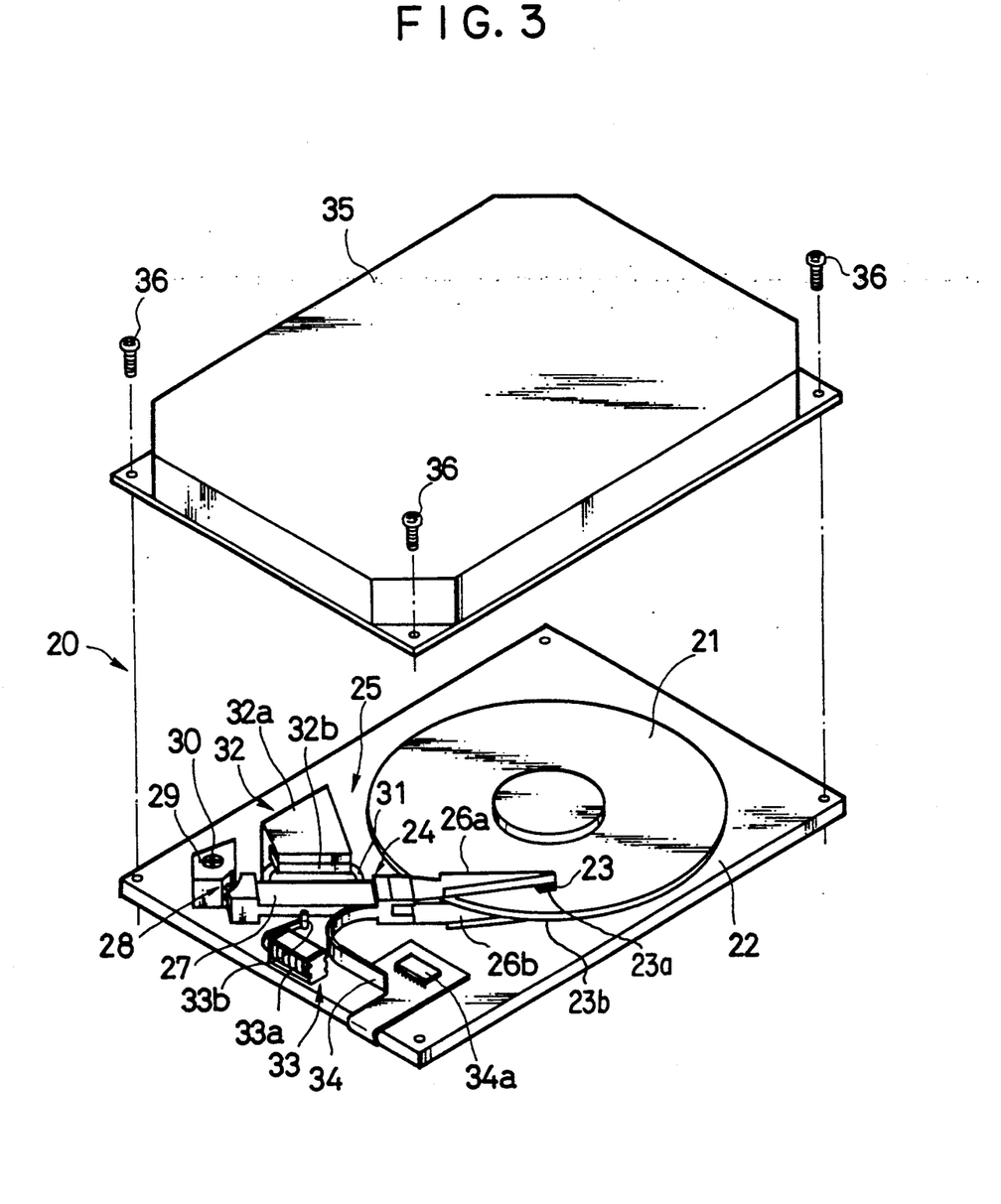
FIG. 3 is a diagonal view of a magnetic disk drive according to the present invention, showing a first modification.

FIG. 3 is a diagonal view of a magnetic disk drive 20 according to the present invention, showing a first modification.

As shown in FIG. 3, a magnetic recording disk 21 for storing information is set on a resinous frame 22 by a supporting means (not shown). The magnetic recording disk 21 is rotated on the frame 22 by a spindle motor (not shown).

On the magnetic recording disk 21, a magnetic head portion 23 for reading or writing the information from/to the recording disk 21 and an arm portion 24 for moving the magnetic head portion 23 in the radial direction of the recording disk 21 are arranged. The arm portion 24 carries the magnetic head portion 23 on one end thereof and rotates around the other end which is almost a rotation center.

Also, on the frame 22, a driver 25 for rotating the arm portion 24 by driving power to a prescribed position is arranged close to the arm portion 24.

The arm portion 24 comprises a pair of suspensions 26a, 26b for carrying the magnetic head portion 23 on the tip thereof, a resin arm 27 connected with the suspensions 26a, 26b at the other end of the suspensions 26a, 26b, an elastic portion 28 integrally molded with the resin arm 27, and a fixed portion 29 integrally molded with both the resin arm 27 and the elastic portion 28 and secured to the frame 22 by a screw 30 to support the resin arm 27 rotatably.

The magnetic head portion 23 comprises a pair of magnetic heads 23a, 23b. The magnetic heads 23a, 23b are positioned on both sides of the recording disk 21 and carried on the suspension 26a, 26b.

Figure 4:
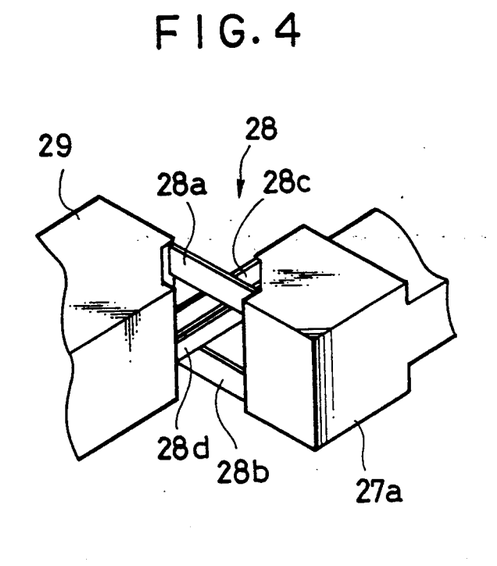
FIG. 4 is a diagonal view of an arm and an elastic portion of the magnetic disk drive shown in FIG. 3, shown in an enlarged scale.

FIG. 4 shows the elastic portion 28 connecting the arm 27 with the fixed portion 29 on an enlarged scale.

As shown in FIG. 4, the fixed portion 29 at a specific position being off the longitudinal direction of the arm 27 is connected with an end portion 27a of the arm 27. That is, the fixed portion 29 is connected with the end portion 27a by a pair of elastic elements 28a, 28b which are extended at right-angles to the longitudinal direction of the arm 27. The elastic element 28a is arranged over the elastic element 28b. Moreover, the fixed portion 29 is connected with the end portion 27a by a pair of elastic elements 28c, 28d which are extended in the longitudinal direction of the arm 27. The elastic elements 28c, 28d are arranged between the elastic elements 28a, 28b and the elastic element 28c is arranged over the elastic element 28d.

Also, the elastic elements 28a to 28d are integrally molded with both the resin arm 27 and the fixed portion 29.

The elastic elements 28a to 28d are made of metal plates, for example stainless plates or phosphor bronze plates. Or, if the life cycle of the magnetic disk drive 20 may be short, it is preferable that the elements 28a to 28d be made of resin.

Figure 5:
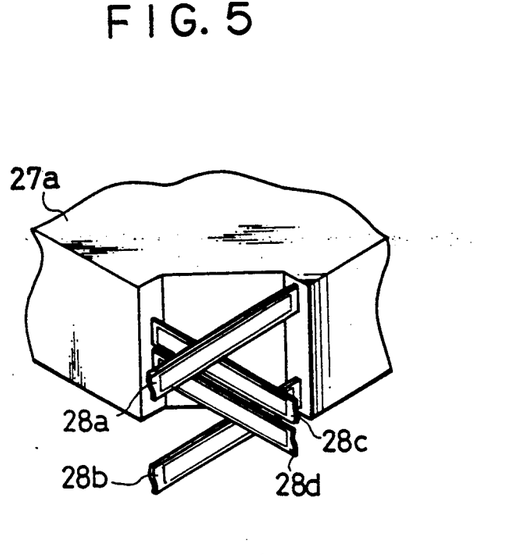
FIG. 5 shows two pairs of elastic elements with damping tapes, the elements being shown in FIG. 4.

As shown in FIG. 5, damping tapes are attached to the surfaces of the elements 28a to 28d for adding a damping effect to the elements 28a to 28d. The damping tapes are applied by a viscoelastic material.

Figure 6:
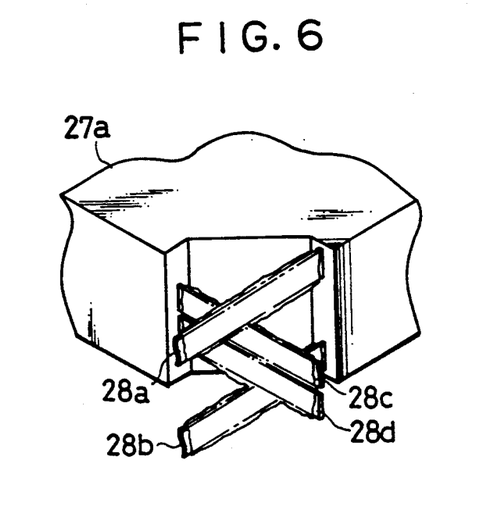
FIG. 6 shows two pairs of elastic elements with viscoelastic material applied over the entire surface thereof, the elements being shown in FIG. 4.

As shown in FIG. 6, it is preferable that a suitable viscoelastic material be applied over the entire surfaces of the elastic elements 28a to 28d so that the elastic elements 28a to 28d are integrally formed.

Figure 7:
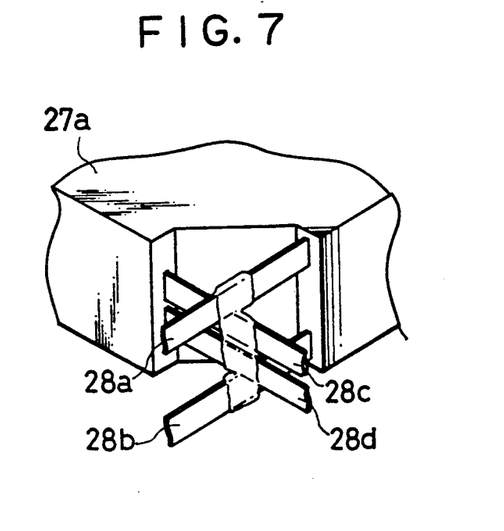
FIG. 7 shows two pairs of elastic elements with viscoelastic material applied to the overhead crossing portion thereof, the elements being shown in FIG. 4.

As shown in FIG. 7, it is preferable that a suitable viscoelastic material be applied to an overhead crossing portion so that the elastic elements 28a to 28d are integrally formed.

In the middle of the resin arm 27, a drive coil 31 is integrally molded with the resin arm 27. The drive coil 31 is driven by a magnetic circuit 32 which is arranged on one side of the resin arm 27. The magnetic circuit 32 comprises a yoke 32a and a magnet 32b. Also, coils of the drive coil 31 are coiled parallel with a plane on which the resin arm 27 is moved.

On the other side of the resin arm 27, a retractor 33 is arranged. The retractor 33 comprises a pushing pin 33b and a solenoid 33a for taking away the pushing pin 33b from the resin arm 27 electrically. The retractor 33 positions the magnetic heads 23a, 23b at a shipping zone when the magnetic disk drive 20 is not in use. That is, the magnetic heads 23a, 23b are positioned to allow movement in the radial direction of the magnetic recording disk 21.

Moreover, on the frame 22, a flexible print circuit 34 is arranged on the other side of the resin arm 27. One end of the flexible print circuit 34 is connected with the magnetic heads 23a, 23b through the suspensions 26a, 26b. The other end of the flexible print circuit 34 is connected with a control circuit (not shown). In the flexible print circuit 34, a head IC 34a is mounted. The head IC 34a amplifies signals provided from the magnetic heads 23a, 23b before transmitting to the control circuit.

The resinous frame 22 is covered with a lid 35 which is made of the same resin as the frame 22. The lid 35 is formed in a box-shape and connected to the frame 22 by screws 36. The space enclosed by both the lid 35 and the frame 22 is sealed up so that internal air in the space is always purified by a circulation filter (not shown). Therefore, the space is maintained at less than 100 dust particles in a cubic foot. The particle size is over 0.5 $\mu$m diameter. The circulation filter is arranged on one side of the magnetic recording disk 21 so that an air flow is generated by the rotation of the magnetic recording disk 21 for filtering.

In a conventional technique, a frame and a lid are made of the same material, for example a kind of metal. Therefore, the lid is not deformed when the external atmospheric pressure becomes high. Therefore, the internal atmospheric pressure of the magnetic disk drive 20 becomes lower than the external atmospheric pressure so that external air passes into the internal space of the magnetic disk drive 20 through a connection portion. This means that the internal air is polluted. Therefore, a respiration filter is indispensable for cleaning up the polluted external air in the conventional magnetic disk drive.

In the present invention, because the frame 22 and the lid 35 are made of resin, the lid 35 is deformed to absorb the pressure difference between the internal and external pressure when the external atmospheric pressure is changed. Accordingly, a respiration filter is not needed in the present invention.

The magnetic recording disk 21 in the present invention is so-called 2.5 inches HDD (hard disk drive) or smaller. Accordingly, the effect for absorbing the pressure difference is remarkable.

Also, though the lid 35 is connected with the frame 22 by screws 36, the number of parts is reduced by using heat-connection and the number of assembly processes is reduced. Therefore, the production cost is reduced.

Also, the heat-connection can be used for connecting the magnetic heads 23a, 23b with the arm portion 24. Therefore, the number of parts and assembly processes are also reduced.

Next, the operation of the present invention is described.

When the magnetic recording disk 21 on the frame 22 is rotated after the spindle motor (not shown) is rotated by receiving a signal from the control unit (not shown), the air on the surface of the magnetic recording disk 21 is rotated with the magnetic recording disk 21. Therefore, the magnetic heads 23a, 23b are floated by 0.2 to 0.3 μm over the magnetic recording disk 21 by a so-called hydrodynamic bearing effect. Then, the magnetic heads 23a, 23b reads servo information stored in the magnetic recording disk 21 so that a drive current is sent in the drive coil 31. When the drive current is sent in the drive coil 31, a magnetic force is generated by magnetic flux arranged in the magnetic circuit 32 so that the arm portion 24 is moved by the magnetic force. That is, the arm portion 24 is rotated and moved around the crossing portion of the elastic portion 28 as a rotation center so that the magnetic heads 23a, 23b carried on the arm portion 24 is positioned at a prescribed position on the magnetic recording disk 21 to carry out the read/write operation.

The elastic portion 28 is arranged at one end portion of the resin arm 27 and the magnetic heads 23a, 23b are arranged at the other end of the resin arm 27 so that the arm portion 24 can be rotated by several degrees towards the periphery of the recording disk 21 and can be rotated by several degrees toward the center of the recording disk 21. That is, the arm portion 24 can be rotated about 14 degrees in total. In other words, the arm portion 24 is stably arranged at a neutral position when no magnetic force is added to the arm portion 24 so that the magnetic head portion 23 on the arm portion 24 can be positioned at the middle point in a doughnut-like information area in which the information in the magnetic recording disk 21 is stored. In cases where the magnetic force is added to the arm portion 24, the arm portion 24 is rotated to read/write the information stored in the doughnut-like information area within several degrees from the middle point toward the periphery of the recording disk 21 or toward the center of the recording disk 21. Therefore, the wrap of the elastic portion 28 is small so that the second resonance frequency is always large.

Also, because the elastic elements 28a to 28d are integrally molded with the resin arm 27 and the fix portion 29, the mass production performance can be improved and high processing accuracy can be easily achieved.

Moreover, because the damping tapes applied by viscoelastic materials are attached to the surface of the elastic elements 28a to 28d, the elastic elements 28a to 28d are given a damping effect. Therefore, the damping effect in the primary and the secondary resonant frequencies is increased so that the servo system for positioning the arm portion 24 is more stable.

It is preferable that the elastic elements 28a, 28b extending at right-angles to the longitudinal direction of the resin arm 27 be increased or decreased in number. Also, it is similarly preferable that the elastic elements 28c, 28d extended in the longitudinal direction of the elastic elements 28a, 28b be increased or decreased in number.

The dynamic rigidity becomes large when a light material for the arm portion is used, while the dynamic rigidity is lowered when the elastic elements are decreased in number. Therefore, as a result, the light arm portion is suitable for practical use.

Also, though the elastic elements 28a, 28b are extended at the right-angles to the elastic elements 28c, 28d in the present invention, it is preferable that the crossing angle be arbitrary.

The rotation center in the elastic elements 28a to 28d decided by the rotation of the arm portion 24 is movable, as opposed to the bearing type having the ball bearings with a fixed rotation center. This effect results from the movement of the load added to the rotation center. Therefore, the secondary resonance frequency is lowered, and then the rigidity of the elastic elements 28a to 28d against the straight movement is lowered.

However, the weight of the movable portion can be light because of the structure according to the present invention, and the dynamic rigidity can be high as a result. This means that the servo system for positioning the arm portion 24 is stabilized.

On the other hand, the elastic elements 28 instead of a pivot portion are used in the present invention, and the arm portion 24 including the elastic elements 28 can be integrally molded. Therefore, the number of parts can be lowered and assembly accuracy can be improved. Moreover, the processing accuracy of the parts is improved.

Next, a second modification according to the present invention is described with reference to FIG. 8 and FIG. 9.

In a magnetic disk drive 40 of the second modification, the same reference code is used for the same element as the first modification.

Figure 8:
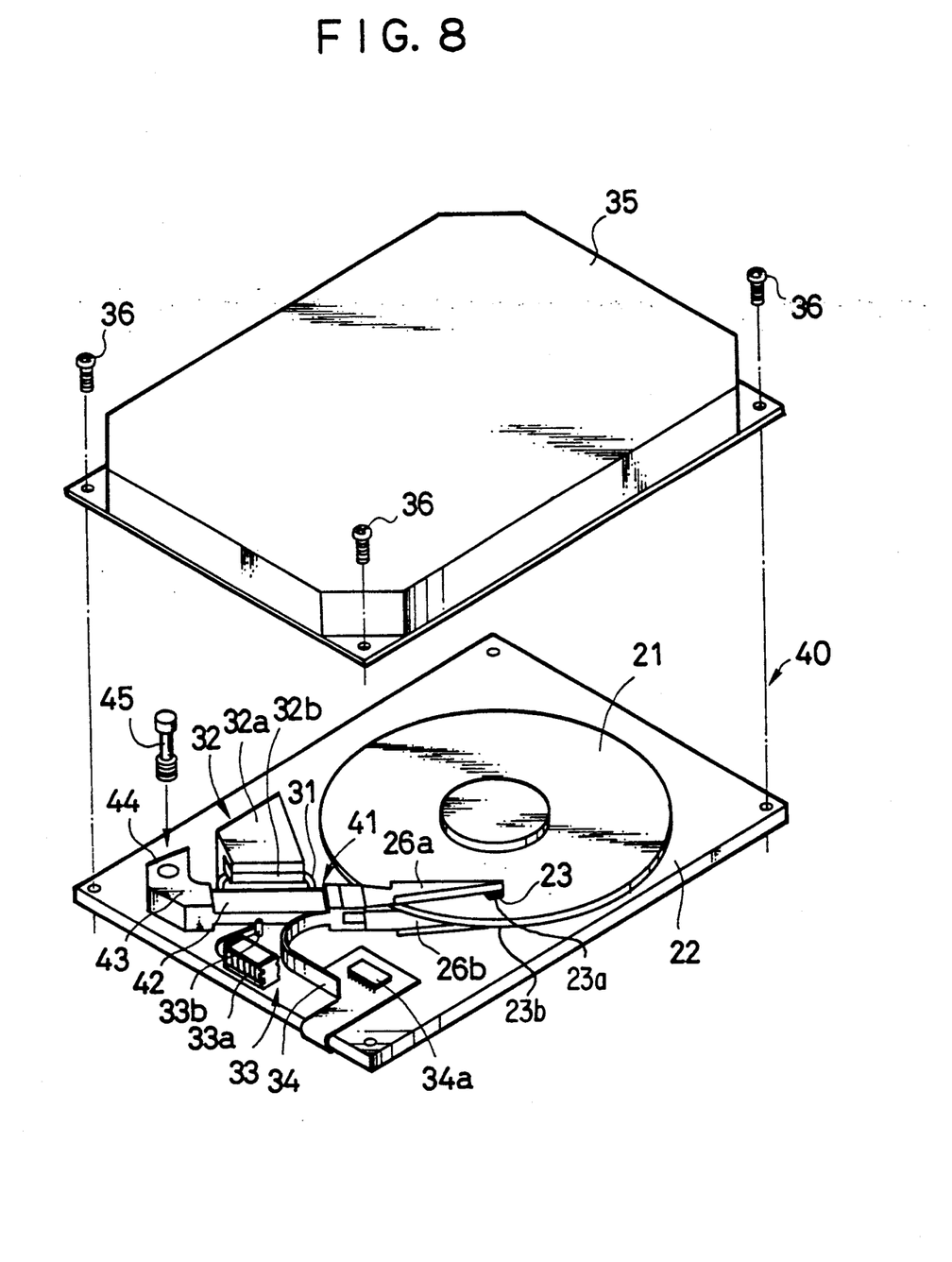
FIG. 8 is a diagonal view of another magnetic disk drive according to the present invention, showing a second modification.

As shown in FIG. 8, an arm portion 41 in the magnetic disk drive 40 comprises the suspensions 26a, 26b for carrying the magnetic heads 23a, 23b on the tip thereof, and a resin arm 42 connected to another end thereof.

The end of the resin arm 42 against the suspensions 26a, 26b is curved to a right angle to form a slide bearing 43 so that the resin arm 42 is L-shaped. This shape is decided for making good use of the dead space made by the magnetic circuit 32.

Figure 9:
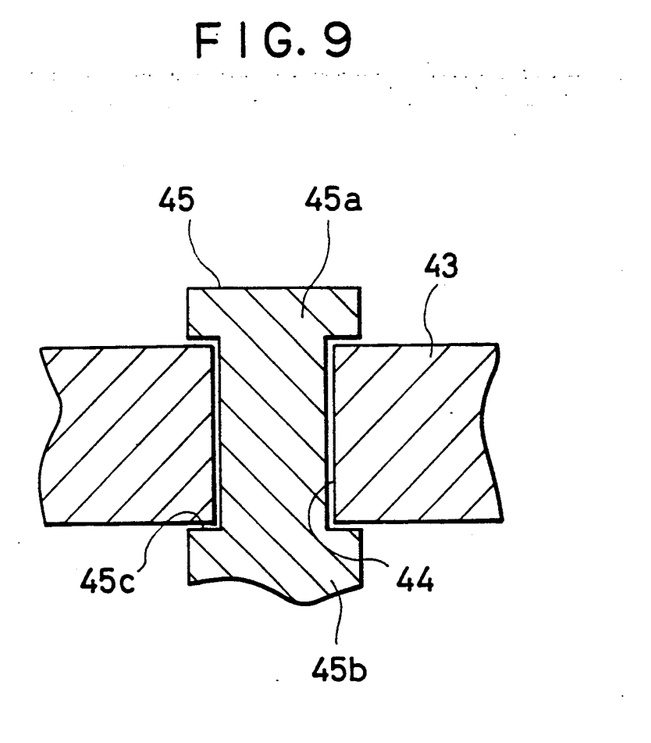
FIG. 9 is a sectional view of a sliding bearing portion of the magnetic disk drive shown in FIG. 5, shown in an enlarged scale.

As shown in FIG. 9, a hole 44 is formed in the slide bearing 43 and a pin 45 is passed through the hole 44. The pin 45 comprises a center portion, and upper and lower end portions 45a, 45b having a larger diameter than the center portion. The lower portion 45b has screw threads. Also, a groove 45c is formed between the pin 45 and the slide bearing 43.

To make the above structure, after passing the pin 45 through the hole 44, the lower portion 45b of the pin 45 is screwed and secured in the frame 22. Therefore, the resin arm 42 is held on the frame 22 rotatably.

Also, the resin arm 42 can not be taken off from the pin 45 by the upper and lower portions 45a, 45b. As shown in FIG. 9, a large clearance is shown between the hole 44 and the pin 45. The clearance is actually set at a suitable size for sliding the slide bearing 43. The size of the clearance is for example 10 to 20 $\mu$m.

When the pin 45 is passing through the hole 44, it is preferable that the pin 45 be divided into the two parts before the upper portion 45a is screwed into the lower portion 45b. Also, it is preferable that the top of the pin 45 be crushed to make the upper portion 45a after passing the pin 45 through the hole 44. Moreover, it is preferable that the lower portion be forcibly passed through the hole 44.

In the above structure of the second modification, the magnetic heads 23a, 23b are floated over the magnetic recording disk 21 by the hydrodynamic bearing effect before reading the positioning information in the same manner as in the first modification. And, after generating the drive current in the drive coil 31, the magnetic heads 23a, 23b are moved to the prescribed position on the magnetic recording disk 21 to carry out the read/write operation.

When the drive current is generated in the drive coil 31, magnetic force is generated by the magnetic flux in the magnetic circuit 32 so that the magnetic heads 23a, 23b carried on the arm portion 24 are positioned at a prescribed position.

Accordingly, in the second modification, the structure is simple and the number of parts is decreased. Therefore, the processing accuracy is improved and the production cost is decreased. Moreover, any external shock does not exert the influence on the disk drive and the magnetic noise is decreased in the disk drive. Also, high recording density is achieved in the disk drive.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A magnetic disk drive with a magnetic head rotationally actuated for reading information stored in a recording disk and/or writing information to the recording disk, comprising:
    a magnetic head for reading and/or writing information to the recording disk;
    an arm portion for carrying the magnetic head on one end thereof;
    an elastic portion for elastically supporting another end of the arm portion, the elastic portion including a first elastic element extended in the longitudinal direction of the arm portion and a second elastic element extended in the lateral direction of the arm portion;
    a fixed portion connected with the arm portion through the first and second elastic elements for holding the arm portion through the elastic portion; and
    a driver for rotating the arm portion by a driving force, the magnetic head carried on the arm portion being moved in the radial direction of the recording disk.

2. A magnetic disk drive according to claim 1, wherein the first and second elastic elements are pliably bent so as to rotate the arm portion, and the elastic portion is stiff to prevent the arm portion from moving straight.

3. A magnetic disk drive according to claim 1, wherein the elastic portion is integrally molded with the arm portion.

4. A magnetic disk drive according to claim 1, wherein a viscoelastic material is applied to the elastic portion for adding viscoelastic characteristics to the elastic portion.

5. A magnetic disk drive according to claim 1, wherein the driver includes a drive coil coiled parallel to a plane on which the arm portion is moved.

6. A magnetic disk drive according to claim 5, wherein a part of the drive coil is integrally molded with the arm portion.

7. A magnetic disk drive according to claim 1, wherein the arm portion is made of resin.

8. A magnetic disk drive according to claim 1, wherein the driving force generated by the driver is given between one end and the other end of the arm portion.

9. A magnetic disk drive according to claim 1, including a resinous frame for setting the recording disk, and a resinous lid for sealing the magnetic disk drive.

10. A magnetic disk drive according to claim 1, wherein the recording disk is a hard disk of which the diameter is equal to or less than 2.5 inches.

* * * * *